US010640701B2

(12) United States Patent
Montalvo et al.

(10) Patent No.: US 10,640,701 B2
(45) Date of Patent: May 5, 2020

(54) ENHANCING PROPPANT PERFORMANCE

(71) Applicant: Halliburton Energy Services, Inc., Houston, TX (US)

(72) Inventors: Janette Cortez Montalvo, Porter, TX (US); Loan Vo, Houston, TX (US); Travis Hope Larsen, Houston, TX (US); Dipti Singh, Houston, TX (US); Philip D Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/072,129

(22) PCT Filed: Mar. 31, 2016

(86) PCT No.: PCT/US2016/025391
§ 371 (c)(1),
(2) Date: Jul. 23, 2018

(87) PCT Pub. No.: WO2017/171811
PCT Pub. Date: Oct. 5, 2017

(65) Prior Publication Data
US 2019/0040310 A1 Feb. 7, 2019

(51) Int. Cl.
*C09K 8/80* (2006.01)
*E21B 43/267* (2006.01)
(Continued)

(52) U.S. Cl.
CPC ............... *C09K 8/80* (2013.01); *C09K 8/68* (2013.01); *C09K 8/805* (2013.01); *C09K 8/88* (2013.01);
(Continued)

(58) Field of Classification Search
CPC ...................................................... E21B 43/267
See application file for complete search history.

(56) References Cited

U.S. PATENT DOCUMENTS 5,095,987 A 3/1992 Weaver et al.
5,799,734 A * 9/1998 Norman .................... C09K 8/62
166/278

(Continued)

FOREIGN PATENT DOCUMENTS

GB 1453001 * 10/1976 .......... C09K 8/5045
WO 2011075653 6/2011
(Continued)

OTHER PUBLICATIONS

International Search Report and Written Opinion PCT/US2016/025391 dated Mar. 31, 2016.
(Continued)

*Primary Examiner* — Angela M DiTrani Leff
(74) *Attorney, Agent, or Firm* — Thomas Rooney; C. Tumey Law Group PLLC

(57) ABSTRACT

A method may comprise providing a concentrated proppant slurry comprising a slurry fluid and a proppant, preparing a fracturing fluid by combining components comprising the concentrated proppant slurry, a carrier fluid, and a dispersing agent, and introducing the fracturing fluid through a wellbore penetrating a subterranean formation at an injection rate and pressure that is at or above the fracture gradient of the subterranean formation.

7 Claims, 1 Drawing Sheet

(51) Int. Cl.
   *C09K 8/68*    (2006.01)
   *C09K 8/88*    (2006.01)
(52) U.S. Cl.
   CPC ........ *E21B 43/267* (2013.01); *C09K 2208/28* (2013.01)

(56) References Cited

U.S. PATENT DOCUMENTS

| | | | | |
|---|---|---|---|---|
| 7,237,609 | B2* | 7/2007 | Nguyen | C09K 8/508 166/280.2 |
| 2006/0178452 | A1* | 8/2006 | Hoefler | C08K 3/36 523/212 |
| 2010/0282468 | A1 | 11/2010 | Willberg et al. | |
| 2011/0284245 | A1* | 11/2011 | Crandall | C09K 8/426 166/386 |
| 2012/0000653 | A1 | 1/2012 | Panga et al. | |
| 2014/0374095 | A1* | 12/2014 | Ladva | C09K 8/80 166/280.2 |

FOREIGN PATENT DOCUMENTS

| | | |
|---|---|---|
| WO | 2015077130 | 5/2015 |
| WO | 2015102580 | 6/2015 |
| WO | 2015160277 | 10/2015 |

OTHER PUBLICATIONS

Application of Polyacrylamide Flocculants for Water Treatment Kurenkov Valery. et al. Dec. 15, 2002.

* cited by examiner

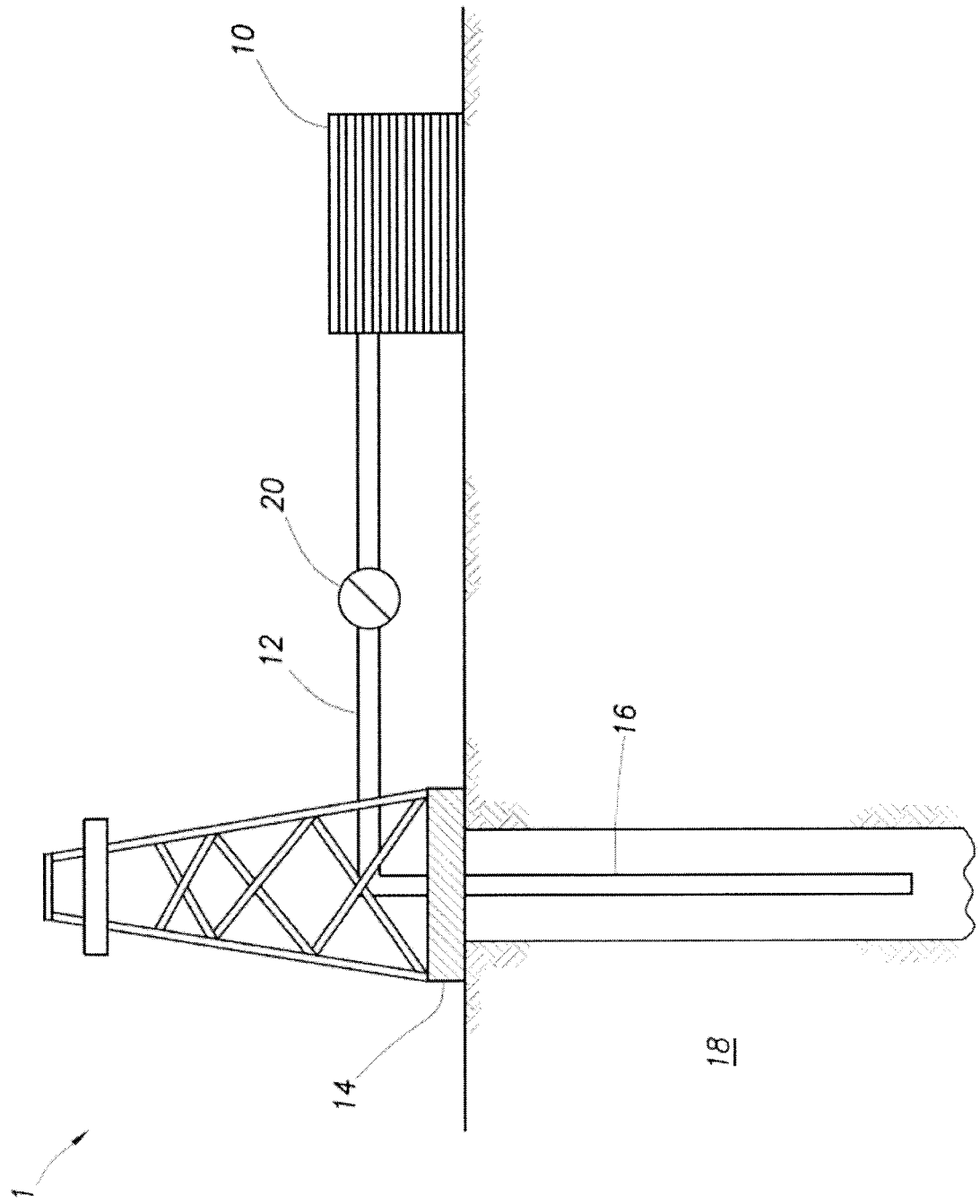

ENHANCING PROPPANT PERFORMANCE

BACKGROUND

Hydrocarbon-producing wells are often stimulated by hydraulic fracturing operations, wherein proppants may be used to hold open or "prop" open fractures created during high-pressure pumping. Once the pumping-induced pressure is removed, proppants may prop open fractures in the rock formation and thus preclude the fracture from closing. As a result, the amount of formation surface area exposed to the well bore is increased, enhancing hydrocarbon recovery rates.

In some examples, a hydraulic fracturing operation may comprise pumping a hydraulic fracturing fluid comprising a carrier fluid and a proppant through a wellbore into a subterranean formation. The high pressure may cause the formation to fracture and may allow the fracturing fluid to enter the fractures created in the formation. In some instances, it may be advantageous to use a micro-proppant to prop open micro-fractures created in the formation. The micro-proppant may aid in additional hydrocarbon recovery by propping open small fractures not accessible by larger-sized proppants. A fracturing fluid comprising a micro-proppant and a large-size proppant may expose more formation surface area to the wellbore than fracturing solely with large-size proppant.

While micro-proppants may allow access to natural and micro-factures which are not accessible by using larger-sized proppant, the use of micro-proppants may present some challenges. By way of example, the micro-proppants may undesirably flocculate and fall out of solution. The micro-proppants may comprise a charged surface which may unfavorably interact with other micro-proppant particles or additives in the fracturing fluid. For example a fracturing fluid may comprise a carrier fluid, a micro-proppant with a negative surface charge, and a friction reducer with a positive surface charge. Micro-proppants may be provided in a dispersion. The opposite charges of the micro-proppant and friction reducer may cause the micro-proppant dispersion to become unstable and may cause the micro-proppant to flocculate and settle out of the fracturing fluid. Examples of other factors that may influence micro-proppant dispersion stability in a fracturing fluid include the net surface charge of the micro-proppant and additives, polymer charge density and molecular weight (polymer bridging), concentration of ions in solution (electrostatic screening), micro-proppant concentration, temperature, and carrier fluid rheology, among others.

BRIEF DESCRIPTION OF THE DRAWINGS

These drawings illustrate certain aspects of the present disclosure, and should not be used to limit or define the disclosure.

The FIGURE is a schematic view of a well system utilized for hydraulic fracturing.

DETAILED DESCRIPTION

The systems, methods, and/or compositions disclosed herein may relate to subterranean operations and, in some systems, methods, and compositions, to introduction of a treatment fluid, such as a fracturing fluid, into a subterranean formation penetrated by a wellbore. In particular, a fracturing fluid may comprise a carrier fluid, concentrated proppant slurry, and optional additives. The formation treatment may be performed in an initial fracturing operation, or during a re-fracturing operation after an initial fracturing operation has been performed on the subterranean zone.

Examples of carrier fluids may include, without limitation, aqueous fluids, non-aqueous fluids, slickwater fluids, aqueous gels, viscoelastic surfactant gels, foamed gels, and emulsions, for example. Examples of suitable aqueous fluids may include fresh water, saltwater, brine, seawater, and/or any other aqueous fluid that may not undesirably interact with the other components used in accordance with the present disclosure or with the subterranean formation. Examples of suitable non-aqueous fluids may include organic liquids, such as hydrocarbons (e.g., kerosene, xylene, toluene, or diesel), oils (e.g., mineral oils or synthetic oils), esters, and any combination thereof. Suitable slickwater fluids may generally be prepared by addition of small concentrations of polymers to water to produce what is known in the art as "slick-water." Suitable aqueous gels may generally comprise an aqueous fluid and one or more gelling agents. Suitable emulsions may be comprised of two immiscible liquids such as an aqueous fluid or gelled fluid and a hydrocarbon. Foams may be created by the addition of a gas, such as carbon dioxide or nitrogen. Additionally, the carrier fluid may be an aqueous gel comprised of an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, may reduce fluid loss and may allow the carrier fluid transport significant quantities of suspended particulates. The density of the carrier fluid may be increased to provide additional particle transport and suspension in some applications.

The concentrated proppant slurry may comprise a slurry fluid, proppant, and one or more additives. The slurry fluid may be any fluid suitable for use in a fracturing fluid. The fluid should be compatible with the subterranean formation and any other fluids or additives in the fracturing fluid. Without limitation the slurry fluid may comprise water or liquid hydrocarbons.

The concentrated proppant slurry may comprise a proppant. Proppants may comprise a particle size from about 0.01 micron to about 500 microns, about 0.1 micron to about 100 microns, about 100 microns to about 200 microns, about 200 microns to about 300 microns, about 300 microns to about 400 microns, about 400 microns to about 500 microns, about 1 micron to about 250 microns, or about 250 microns to about 500 microns. In some examples, the proppant may be considered a micro-proppant. As used herein, the term "micro-proppant" refers to proppant having a particle size of less than about 150 microns. Proppants may comprise any suitable material. In general proppants should have a crush strength higher than the fracture gradient of the formation so as to avoid crushing the proppant. Proppants should also be resistant to chemical attack from chemicals present in the subterranean formation and from chemicals added to the fracturing fluid. Some suitable proppants without limitation may include silica sand, calcium carbonate sand, resin coated sand, ceramic proppants, fly ash, and sintered bauxite. An example of a commercial proppant suitable for use is MONOPROP® Lightweight Proppant available from Halliburton Energy Services Inc. Proppants may comprise any density. In some examples, proppants may be classified as lightweight or low density and may have a density of about 1.25 to about 2.2 g/cm$^3$. Using a low density proppant may have several advantages including but not limited to increased conductivity, easier placing with low viscosity fluids, and more uniform distribution within a fracture. Proppants may comprise any shape, including but not limited, to spherical, toroidal, amorphous, planar, cubic, or cylindrical. Proppants may further comprise any roundness and sphericity. Proppant may be present in any concentration or loading. Without limitation, the proppant may be present in an amount of about 1 pounds per gallon ("lb/gal") to about 20 lb/gal, about 1 lb/gal to about 5 lb/gal, about 5 lb/gal to about 10 lb/gal, about 10 lb/gal to about 15 lb/gal, about 15 lb/gal to about 20 lb/gal, about 1 lb/gal to about 10 lb/gal, or about 10 lb/gal to about 20 lb/gal. With the benefit of this disclosure, one of ordinary skill in the art should be able to select an appropriate proppant and loading.

The concentrated proppant slurry may comprise one or more additives. In some examples, the additive may comprise a dispersing agent. Dispersing agents may comprise any chemical that disrupts the surface interactions of proppant and potential flocculating agents in the fracturing fluid. Some examples of dispersants without limitation may include aminosilanes, acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, sodium acrylate homopolymer, and sodium nitrite. Additional additives may include, but are not limited to, surfactants, friction reducers, lubricants, and consolidating agents. The additives may be present in any concentration. Without limitation, the additives, including the dispersing agents, may be present in an amount of about 1 to about 50 gallons per thousand (GPT), about 1 to about 10 GPT, about 10 to about 20 GPT, about 20 to about 30 GPT, about 30 to about 40 GPT, about 40 to about 50 GPT, about 1 to about 25 GPT, or about 25 to about 50 GPT. GPT refers to gallons of additive per thousand gallons of fluid the additive is placed in. One of ordinary skill in the art, with the benefit of this disclosure, should be able to select appropriate additives and concentrations for a particular application.

The proppant may comprise an electrically charged surface. In some examples, the proppant surface charge may be negative or anionic. Some fracturing fluid additives may comprise surface charges that are opposite of the proppant. In some examples, clay control agents and friction reducing agents may comprise positive surface charges. In solution, the particles of opposite charges may interact which may cause the proppant to flocculate and fall out of solution. The addition of a dispersing agent may reduce the interactions between the opposite-charged molecules thereby reducing or eliminating the flocculating of proppant.

In some examples, the concentrated proppant slurry may be pre-mixed and delivered to the well site. This may have some advantages over mixing concentrated proppant slurry on the fly at the well site including, but not limited to, minimized dust and less equipment on site. The concentrated proppant slurry may be delivered by chemical tote, barrel, or any other means. In another example, the concentrated proppant slurry is made on site and mixed with the carrier fluid and optional additives on the fly. The concentrated proppant slurry may also be stored for later use. The concentrated proppant slurry may be diluted and combined with a carrier fluid and optional additives to form the fracturing fluid. The final physical properties of the fracturing fluid such as viscosity and density will depend on the relative amounts of carrier fluid, proppant, and optional additives. Without limitation the viscosity may be about 3 cP to about 20 cP, about 3 cP to about 10 cP, or about 10 cP to about 20 cP. One of ordinary skill in the art, with the benefit of this disclosure, should be able to select appropriate additives and concentrations for a particular application. The fracturing treatment fluid may also be combined with other subterranean treatments which may include, without limitation, matrix acidizing and fracture acidizing.

The fracturing fluid may comprise any number of optional additives, including, but not limited to, salts, acids, fluid loss control additives, gas, foamers, corrosion inhibitors, scale inhibitors, catalysts, clay control agents, biocides, friction reducers, iron control agent, antifoam agents, bridging agents, dispersants, hydrogen sulfide ("$H_2S$") scavengers, carbon dioxide ("$CO_2$") scavengers, oxygen scavengers, lubricants, viscosifiers, breakers, weighting agents, inert solids, emulsifiers, emulsion thinner, emulsion thickener, surfactants, lost circulation additives, pH control additive, buffers, crosslinkers, stabilizers, chelating agents, mutual solvent, oxidizers, reducers, consolidating agent, complexing agent, particulate materials and any combination thereof. With the benefit of this disclosure, one of ordinary skill in the art should be able to recognize and select a suitable optional additive for use in the fracturing fluid.

In certain systems, methods, and/or compositions of the present disclosure, a friction reducer may be used. The friction reducer may be included in the fracturing fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the fracturing fluid. The term "polymer" in the context of a friction reducing polymer, may be intended to refer to the acid form of the friction reducing polymer, as well as its various salts.

The friction reducing polymer may be included in the fracturing fluid, for example, in an amount of about 0.5 to about 10 GPT, about 0.5 to about 5 GPT, or about 5 to about 10 GPT. The friction reducing polymers may be included in the fracturing fluid in an amount sufficient to reduce friction without gel formation upon mixing. By way of example, the fracturing fluid comprising the friction reducing polymer may not exhibit an apparent yield point. While the addition of a friction reducing polymer may minimally increase the viscosity of the fracturing fluid, the polymers may generally not be included in the example fracturing fluid in an amount sufficient to substantially increase the viscosity. For example, when proppant is included in the fracturing fluid, velocity rather than fluid viscosity generally may be relied on for proppant transport. Additionally, the friction reducing polymer may be present in an amount in the range from about 0.01% to about 0.15% by weight of the carrier fluid. Alternatively, the friction reducing polymer may be present in an amount in the range from about 0.025% to about 0.1% by weight of the carrier fluid.

A method may comprise providing a concentrated proppant slurry comprising a slurry fluid and a proppant; preparing a fracturing fluid by combining components comprising the concentrated proppant slurry, a carrier fluid, and a dispersing agent; and introducing the fracturing fluid through a wellbore penetrating a subterranean formation at an injection rate and pressure that is at or above the fracture gradient of the subterranean formation. This method may include any of the various features of the compositions, methods, and systems disclosed herein, including one or more of the following features in any combination. The method may also comprise introducing the fracturing fluid in to the subterranean formation after at least one primary fracture has been generated in the subterranean formation. The proppant may have a particle size of about 0.01 micron to about 500 microns. The proppant may comprise a micro-proppant wherein the micro-proppant has a particle size of about 1 micron to about 150 microns. The proppant may be present in the concentrated proppant slurry in a concentration of about 10 lb/gal to about 20 lb/gal. The dispersing agent may be a component of the concentrated proppant slurry. The dispersing agent may comprise at least one dispersing agent selected from the group consisting of aminosilanes, acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, silicon dioxide, sodium acrylate homopolymer, and sodium nitrite. The carrier fluid may be a slickwater fluid wherein the slickwater fluid comprises an aqueous fluid and friction reducing polymer. The slurry fluid may comprise an aqueous fluid. The proppant may comprise at least one particulate selected from the group consisting of silica sand, calcium carbonate sand, resin coated sand, ceramic, fly ash, and sintered bauxite. The proppant slurry may be pre-mixed before combining the carrier fluid and the dispersing agent.

A concentrated proppant slurry may comprise a slurry fluid, a proppant in a concentration of about 1 lb/gal to about 20 lb/gal, and a dispersing agent. This concentrated proppant slurry may include any of the various features of the compositions, methods, and systems disclosed herein, including one or more of the following features in any combination. The proppant may further be present in a concentration of about 10 lb/gal to about 20 lb/gal. The proppant may have a particle size of about 0.01 micron to about 500 microns. The proppant may be a micro-proppant having a particle size of about 1 micron to about 150 microns. The proppant may comprise at least one particulate selected from the group consisting of silica sand, calcium carbonate sand, resin coated sand, ceramic, fly ash, and sintered bauxite. The dispersing agent may comprise at least one dispersing agent selected from the group consisting of aminosilanes, acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, silicon dioxide, sodium acrylate homopolymer, and sodium nitrite. The slurry fluid may comprise an aqueous fluid.

A system may comprise a dispersing agent; a concentrated proppant slurry comprising a slurry fluid and a proppant; a carrier fluid; mixing equipment operable to mix a fracturing fluid comprising the dispersing agent, the concentrated proppant slurry, and the carrier fluid; and pumping equipment operable to deliver the fracturing fluid into a subterranean formation at or above a fracture gradient of the subterranean formation. This system may include any of the various features of the compositions, methods, and systems disclosed herein, including one or more of the following features in any combination. The proppant may have a particle size of about 0.01 micron to about 500 microns. The proppant may comprise a micro-proppant wherein the micro-proppant has a particle size of about 1 micron to about 150 microns. The proppant may be present in the concentrated proppant slurry in a concentration of about 10 lb/gal to about 20 lb/gal dispersing agent may be present in the concentrated proppant slurry. The dispersing agent may comprise at least one dispersing agent selected from the group consisting of aminosilanes, acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, silicon dioxide, sodium acrylate homopolymer, and sodium nitrite. The carrier fluid may be a slickwater fluid wherein the slickwater fluid comprises an aqueous fluid and friction reducing polymer. The slurry fluid may comprise an aqueous fluid. The proppant may comprise at least one particulate selected from the group consisting of silica sand, calcium carbonate sand, resin coated sand, ceramic, fly ash, and sintered bauxite. The proppant slurry may be pre-mixed before combining the carrier fluid and the dispersing agent.

In various examples, systems configured for delivering the treatment fluids described herein to a downhole location are described. In various examples, the systems can comprise a pump fluidly coupled to a tubular, the tubular containing a treatment fluid comprising a carrier fluid, proppant slurry, and optional additives.

The pump may be a high pressure pump in some examples. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some examples, the high pressure pump may be capable of fluidly conveying particulate matter, such as proppant, into the subterranean formation. Suitable high pressure pumps will be known to one having ordinary skill in the art and may include, but are not limited to, floating piston pumps and positive displacement pumps.

In other examples, the pump may be a low pressure pump. As used herein, the term "low pressure pump" will refer to a pump that operates at a pressure of about 1000 psi or less. In some examples, a low pressure pump may be fluidly coupled to a high pressure pump that is fluidly coupled to the tubular. That is, in such examples, the low pressure pump may be configured to convey the treatment fluid to the high pressure pump. In such examples, the low pressure pump may "step up" the pressure of the treatment fluid before it reaches the high pressure pump.

In some examples, the systems described herein can further comprise a mixing tank that is upstream of the pump and in which the treatment fluid is formulated. In various examples, the pump (e.g., a low pressure pump, a high pressure pump, or a combination thereof) may convey the treatment fluid from the mixing tank or other source of the treatment fluid to the tubular. In other examples, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole The FIGURE shows an illustrative schematic of a system that can deliver fracturing fluids to a downhole location, according to one or more examples. As described herein, the fracturing fluids may comprise a carrier fluid, concentrated proppant slurry, and optional additives. It should be noted that while the FIGURE generally depicts a land-based system, it is to be recognized that like systems may be operated in subsea locations as well. As depicted in the FIGURE, system 1 may include mixing tank 10, in which a fracturing fluid may be formulated. The fracturing fluid may be conveyed via line 12 to wellhead 14, where the fracturing fluid enters tubular 16, tubular 16 extending from wellhead 14 into subterranean formation 18. Upon being ejected from tubular 16, the fracturing fluid may subsequently penetrate into subterranean formation 18. Pump 20 may be configured to raise the pressure of the fracturing fluid to a desired degree before its introduction into tubular 16. The fracturing fluid may be introduced into subterranean formation 18 at any stage of a fracturing operation. For example, the fracturing fluid may be introduced into the subterranean formation 18 after one or more factures have been initiated. Fractures may be introduced for example by a pad stage. It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the fracturing fluid may, in some examples, flow back to wellhead 14 and exit subterranean formation 18. In some examples, the fracturing fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

At least a portion of the subterranean formation 18 may comprise a permeability ranging from a lower limit of about 0.1 nano Darcy (nD), 1 nD, 10 nD, 25 nD, 50 nD, 100 nD, or 500 nD to an upper limit of about 10 mD, 1 mD, 500 microD, 100 microD, 10 microD, or 500 nD, and wherein the permeability may range from any lower limit to any upper limit and encompass any subset therebetween. Without limitation, the subterranean formation 120 may be considered an ultra-tight formation, for example, having a permeability of about 1 mD or less, which may be a shale formation, sandstone formation, or other type of rock formation.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

To facilitate a better understanding of the present disclosure, the following examples of certain aspects of some of the systems, methods and cement compositions are given. In no way should the following examples be read to limit, or define, the entire scope of the disclosure.

EXAMPLE 1

In this example, micro-proppant in the form of fly ash was analyzed for oxide composition. The results are displayed in Table 1. The proppant has a mean particle size of approximately 5 microns.

TABLE 1

Elemental Oxide Analysis of Proppant

| As Oxides | Wt % | As Element | Wt % |
|---|---|---|---|
|  |  | O | 46.76% |
| Na2O | 2.33% | Na | 1.73% |
| MgO | 0.87% | MgO | 0.52% |
| Al2O3 | 26.11% | Al | 13.82% |
| SiO2 | 49.74% | Si | 23.25% |
| SO3 | 3.04% | Si | 1.22% |
| K2O | 2.14% | K | 1.78% |
| CaO | 2.63% | Ca | 1.88% |
| TiO2 | 1.53% | Ti | 0.91% |
| MnO | 0.00% | Mn | 0.00% |
| Fe2O3 | 11.62% | Fe | 8.13% |
| Sum | 100.00% | Sum | 100.00% |

A concentrated proppant slurry was prepared by mixing 10 lb/gal micro-proppant, 10 GPT aminosilane, and water. The concentrated proppant slurry was then poured at approximately 45°, and it was observed that the concentrated proppant slurry flowed easily.

EXAMPLE 2

A second concentrated proppant slurry was prepared by mixing 10 lb/gal micro-proppant, 10 GPT of an ammonium salt copolymer acrylate, and water. The concentrated proppant slurry was then poured at approximately 45°, and it was observed that the concentrated proppant slurry flowed easily.

EXAMPLE 3

Two concentrated proppant slurries were prepared as in Example 1. One concentrated proppant slurry contained an aminosilane and the other did not. The concentrated proppant slurries were then added at a concentration of 0.1 GPT to a slick water solution. The slick water was a mixture of friction reducer (FR) and water. It was observed that the individual particles of the proppant flocculated and sank to the bottom of the container in the sample without aminosilane. It was further observed that the concentrated proppant slurry containing aminosilane did not fall out of solution.

EXAMPLE 4

Two concentrated proppant slurries were prepared as in Example 2. One slurry contained an ammonium salt copolymer acrylate and the other did not. The concentrated proppant slurries were then added at a concentration of 0.1 GPT to a slick water solution. The slick water was a mixture of friction reducer (FR) and water. It was observed that the individual particles of proppant flocculated and sank to the bottom of the container in the sample without the ammonium salt copolymer acrylate. It was further observed that the proppant sample containing ammonium salt copolymer acrylate did not fall out of solution.

What is claimed is:

1. A method of hydraulic fracturing comprising:
    providing a concentrated proppant slurry comprising:
        a slurry fluid;
        a micro-proppant having a particle size of about 1 micron to about 150 microns; and
        an aminosilane dispersing agent;
    preparing a fracturing fluid by combining the concentrated proppant slurry, a friction reducing polymer, and a carrier fluid;
    introducing the fracturing fluid into a wellbore penetrating a subterranean formation at or above a fracture gradient of the subterranean formation.

2. The method of claim 1 wherein the fracturing fluid is introduced into the subterranean formation after at least one primary fracture has been generated in the subterranean formation.

3. The method of claim 1 wherein the dispersing agent further comprises at least one dispersing agent selected from the group consisting of acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, silicon dioxide, sodium acrylate homopolymer, and sodium nitrite.

4. The method of claim 1 wherein the carrier fluid is a slickwater fluid comprising an aqueous fluid and the friction reducing polymer.

5. The method of claim 1 wherein the slurry fluid comprises an aqueous fluid.

6. The method of claim 1 wherein the micro-proppant comprises at least one particulate selected from the group consisting of silica sand, calcium carbonate sand, resin coated sand, ceramic, fly ash, and sintered bauxite.

7. The method of claim 1 wherein the micro-proppant is fly ash.

* * * * *